Figure 1:
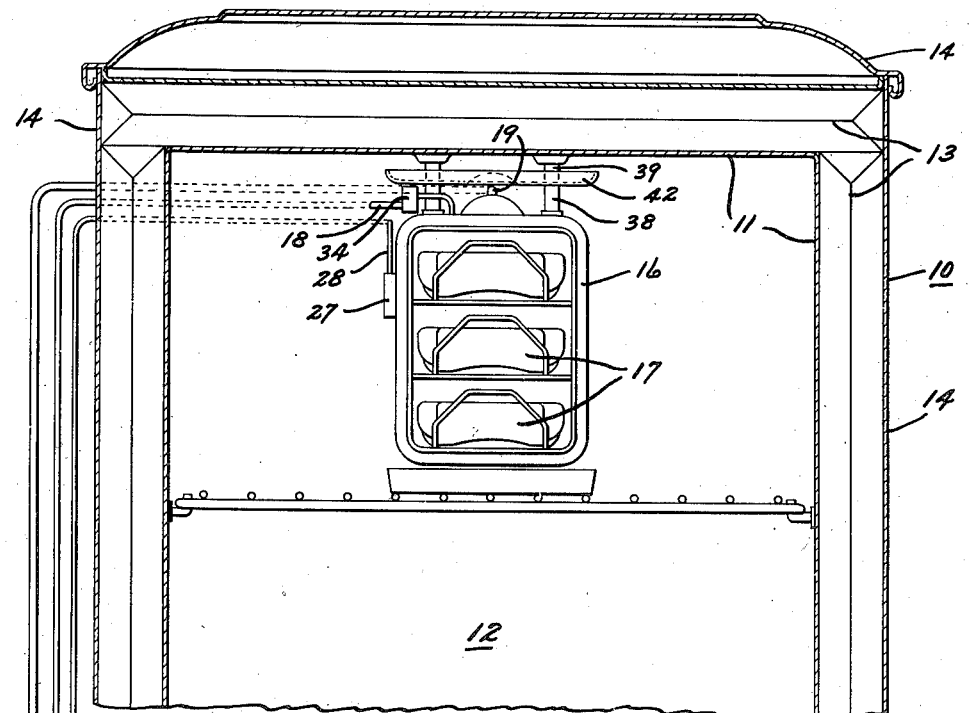

Oct. 27, 1936.  E. F. SCHWELLER  2,058,916

REFRIGERATING APPARATUS

Filed May 20, 1935

INVENTOR.
EDMUND F. SCHWELLER.

BY
Spencer, Hardman and Fehr
HIS ATTORNEYS.

Patented Oct. 27, 1936

2,058,916

UNITED STATES PATENT OFFICE 2,058,916

REFRIGERATING APPARATUS

Edmund F. Schweller, Dayton, Ohio, assignor to General Motors Corporation, Dayton, Ohio, a corporation of Delaware Application May 20, 1935, Serial No. 22,334

7 Claims. (Cl. 62—116)

This invention relates to refrigerating apparatus and particularly to household refrigerator cabinets wherein a cooling element or evaporator is mounted in the food storage compartment thereof.

It has been found that a cooling element or evaporator mounted near a wall of the metal liner of a food storage compartment of a refrigerator cabinet will radiate cold, produced by the evaporator, upon the food compartment metal liner and will cause moisture to condense and accumulate on the liner. This is particularly true in certain territories where the air is very humid or, in other words, laden with moisture and is admitted to the food storage compartment by opening and closing the compartment door in the ordinary use of the refrigerator. The accumulation of condensed moisture on the metal wall of a food storage compartment and particularly the top wall thereof causes water to drip onto the food products or into receptacles containing the products and disposed within the food storage compartment. The drip water from such condensation contaminates the food stored in the cold storage compartment. My invention is therefore directed to eliminating sweating or accumulation of moisture on a wall of the food compartment of a refrigerator cabinet.

An object of my invention is to obstruct the radiation of cold produced by an evaporator of a refrigerating system mounted adjacent and in close proximity to a wall of a food storage compartment of a refrigerator cabinet to prevent condensation of moisture and accumulation thereof on the compartment wall adjacent the evaporator.

Another object of my invention is to mount an evaporator of a refrigerating system closely adjacent the top wall of a food storage compartment in order to provide maximum food storage space in the compartment and to place a baffle member between the evaporator and the compartment wall adjacent the evaporator for the purpose described in the foregoing object.

Further objects and advantages of the present invention will be apparent from the following description, reference being had to the accompanying drawing, wherein a preferred form of the present invention is clearly shown.

Figure 2:
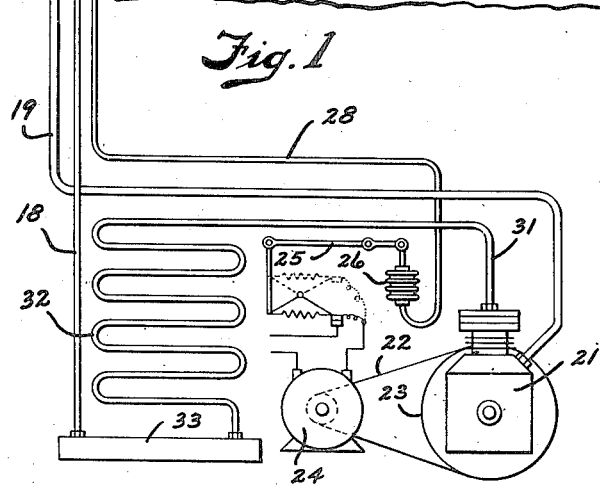
Figure 2:
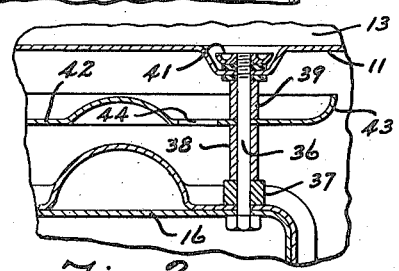

In the drawing:

Fig. 1 is a fragmentary vertical sectional view of a refrigerator cabinet having my invention incorporated therein; and Fig. 2 is a fragmentary vertical sectional view showing a baffle mounted between the evaporator and the wall of a food storage compartment from which evaporator is suspendingly supported.

Referring to the drawing, for the purpose of illustrating the invention, I have shown in Fig. 1 thereof a refrigerator cabinet 10 of the household type. Cabinet 10 comprises a metal liner member 11 forming or providing walls of a food storage compartment 12 in the cabinet. The metal food compartment liner 11 is surrounded by any suitable or well-known insulating material, generally indicated by the reference character 13, for preventing or retarding the flow of heat to the food compartment walls. The insulating material 13 is surrounded or covered by a shell or by metal panels 14 which form the exterior finish walls of the cabinet and which support the food compartment liner 11 and the insulation 13. A cooling element or evaporator 16, preferably of the sheet metal variety and adapted to receive a plurality of receptacles or ice trays 17, is mounted within the food storage compartment 12 of cabinet 10. Evaporator 16 is supported within the compartment 12 by being suspended from and positioned closely adjacent the top wall of the compartment lining member 11. The evaporator 16 is provided with a plurality of closed refrigerant conveying passages wherein refrigerant, upon entering the evaporator, vaporizes in absorbing heat from the receptacle 17 and food compartment 12. The refrigerant passages in the evaporator have an inlet and an outlet opening which are connected by pipes 18 and 19 respectively to a refrigerant liquefying and circulating unit. The refrigerant liquefying and circulating unit includes a compressor 21 operatively connected, through belt and pulley connections 22 and 23, to an electric motor 24. Operations of motor 24 and consequently compressor 21 are controlled by any suitable or well-known electric snap switch 25. The switch 25 is actuated by movement of a bellows 26 in response to changes in pressure of a fluid contained in a thermostat bulb 27 and pipe 28 connected to the bellows 26. Bulb 27 is in thermal contact with the evaporator 16 and therefore controls operation of the refrigerant liquefying and circulating unit to cause the evaporator to produce a refrigerating effect for cooling the food compartment 12. When switch 25 is closed, to complete the electric circuit to motor 24, the motor operates compressor 21. Compressor 21 withdraws vaporized or gaseous refrigerant from evaporator 16, through pipe 19, compresses the refrigerant and forces same under pressure, through a pipe 31, to a condenser 32. The compressed refrigerant is cooled and liquefied in any suitable and well-known manner in condenser 32 and flows into a reservoir receiver 33 where it is stored prior to being circulated to evaporator 16. An expansion or any other suitable type of valve 34, interposed in the liquid refrigerant pipe line 18 and located adjacent evaporator 16, may be utilized to control the flow of liquid refrigerant to the evaporator.

In an installation of the type disclosed wherein the evaporator 16 is positioned closely adjacent the top wall of the food compartment 12 the refrigerating effect produced by the evaporator is ordinarily radiated upon the surface of the metal liner 11 of the food compartment in the vicinity of the eveparator and this radiation of cold lowers the temperature of the liner 11 to a degree sufficient to cause moisture in the air within the food compartment to condense on the liner 11. As previously stated this moisture continues to accumulate along the top wall of compartment 12 formed by liner 11, in the form of drops of water, and will, after attaining a certain weight, drop onto food products or into receptacles containing the products stored in the compartment 12. Since my invention is directed to eliminating the dropping of water onto the food products stored within the cold storage compartment of a refrigerator cabinet I provide a means for obstructing the radiation of cold to the top wall of food compartment 12 in the vicinity of the evaporator 16 so as to prevent the top wall 11 from being reduced in temperature below the dew point of moisture in the air within compartment 12. In the present disclosure the evaporator 16 is supported in compartment 12 by being suspended from the top wall of liner 11. A plurality of bolts or the like members 36 pass through a wall of evaporator 16 (see Fig. 2) and through openings provided in the top of the metal food compartment lining member. A plurality of collars 37, 38 and 39 surround each of the bolts 36 and a nut 41 secures the bolt 36 to the top wall of the food compartment. In the present invention I interpose a baffle member 42 between the evaporator 16 and the top wall 11 of the food compartment. This baffle member 42 may be of metallic material and is secured in spaced relation to the evaporator 16 and compartment wall 11 by the bolts 36 and collars 38 and 39. The baffle member 42 has its edges turned up as at 43 to form a pan and it will be noted that the baffle is slightly wider and preferably longer than the cooling element or evaporator 16. A small opening 44 is provided in the pan-shaped baffle member 42 for a purpose to be hereinafter described.

During operation of the apparatus, to cause evaporator 16 to produce a refrigerating effect, the evaporator radiates the low temperature being produced therein to reduce the temperature of air and to create a circulation thereof in the food compartment 12. Baffle 42 obstructs radiation of cold from the evaporator 16 to the metal top wall of the food compartment 12 and thereby prevents the temperature of the compartment top wall from being lowered to a degree to cause condensation of moisture thereon. The baffle 42 thus causes the food compartment top wall to be maintained substantially within the temperature range at which the air within the food storage compartment is maintained. Therefore no condensation of moisture will occur on the top wall of the food compartment 12 and dripping of moisture upon food products stored within the food storage compartment will be prevented. Since air within the food compartment 12 is free to flow over the evaporator 16 and around to baffle 42, and since the baffle is in close proximity to the evaporator and consequently of a lower temperature than the top wall of the food compartment moisture may condense on the baffle 42. Any moisture accumulating on the top side of baffle 42 is prevented from flowing thereover onto food products by the up-turned edge portions 43 on the baffle and this moisture will therefore be directed through the opening 44. Moisture flowing through opening 44, provided in baffle 42, falls upon the evaporator 16 and becomes frozen thereto. Any conventional drip pan or other drip water collecting means may be positioned beneath the evaporator for catching drip water flowing therefrom upon defrosting of the evaporator.

From the foregoing it will be seen that I have provided an improved refrigerating apparatus and that I have provided means for insuring the storage of food products in the storage compartment of a refrigerator cabinet in a cool dry condition over long periods of time. My invention therefore eliminates difficulties encountered in the storage of food products in mechanically refrigerated refrigerator cabinets in certain localities where the atmosphere is ladened with moisture.

While the form of embodiment of the invention as herein disclosed, constitutes a preferred form, it is to be understood that other forms might be adopted, all coming within the scope of the claims which follow.

What is claimed is as follows:

1. A refrigerating apparatus comprising in combination, a cabinet, means forming a plurality of walls of a food storage compartment within said cabinet, a cooling element of a refrigerating system mounted in said compartment and disposed in close proximity to a wall thereof, means for circulating a refrigerating medium through said element to cause the element to produce a refrigerating effect to thereby create a circulation of air within said food compartment, and means interposed between said cooling element and said compartment wall portion adjacent the element to obstruct radiation of cold from said element to said compartment wall portion for preventing condensation of moisture on the food compartment wall, said last named means being spaced from said cooling element and from said compartment wall portion to permit air circulating within said food storage compartment to flow across both sides thereof.

2. A refrigerating apparatus comprising in combination, a cabinet, a plurality of insulating walls forming a food storage compartment within said cabinet, a metal liner member for the walls of said food compartment, a cooling element of a refrigerating system mounted in said compartment and disposed in close proximity to said metal liner, means for circulating a refrigerating medium through said element to cause the element to produce a refrigerating effect to thereby create a circulation of air within said food compartment, and means interposed between said cooling element and said liner portion adjacent the element to obstruct radiation of cold from said element to said liner portion for preventing condensation of moisture on the metal liner, said last named means being spaced from said cooling element and from said liner portion adjacent thereto to permit air circulating within said food storage compartment to flow across both sides thereof.

3. A refrigerating apparatus comprising in combination, a cabinet, means forming a plurality of walls of a food storage compartment within said cabinet, a cooling element of a refrigerating system supported in said compartment by being suspended from and disposed in close proximity to the top wall of said compartment, means for circulating a refrigerating medium through said element to cause the element to produce a refrigerating effect to thereby create a circulation of air within said food compartment, and means interposed between said element and the top wall of said compartment adjacent the element to obstruct radiation of cold from said element to the top wall of the compartment for preventing condensation of moisture thereon, said last named means being spaced from said cooling element and from said compartment top wall to thereby permit air circulating within said food storage compartment to flow across both sides thereof.

4. A refrigerating apparatus comprising in combination, a cabinet, a plurality of insulating walls forming a food storage compartment within said cabinet, a metal liner member for the walls of said food compartment, a cooling element of a refrigerating system supported in said compartment by being suspended from and disposed in close proximity to the top wall of said liner member, means for circulating a refrigerating medium through said element to cause the element to produce a refrigerating effect to thereby create a circulation of air within said food compartment, and means interposed between said element and the liner portion adjacent the element to obstruct radiation of cold from said cooling element to the top wall of said liner member for preventing condensation of moisture on the metal liner member, said last named means being spaced from said cooling element and from said metal liner top wall of said compartment to thereby permit air circulating within the food storage compartment to flow across both sides thereof.

5. A refrigerating apparatus comprising, in combination, a cabinet, means forming a plurality of walls of a food storage compartment within said cabinet, a cooling element of a refrigerating system within said compartment, means for circulating a refrigerating medium through said element to cause the element to produce a refrigerating effect to thereby create a circulation of air within said food compartment, means for suspendingly supporting said cooling element from and in close proximity to the top wall of said compartment, and a metal baffle member interposed between said element and the top wall of said compartment to obstruct radiation of cold from the cooling element to the top wall of said compartment for preventing condensation of moisture on the compartment wall, said baffle member being secured in position by said cooling element supporting means, and said baffle member being spaced from said cooling element and from said compartment top wall to permit air circulating within the food storage compartment to flow across both sides thereof.

6. A refrigerating apparatus comprising in combination, a cabinet, a plurality of insulated walls forming a food storage compartment within said cabinet, a metal liner member for the walls of said food compartment, a cooling element of a refrigerating system within said compartment, means for circulating a refrigerating medium through said element to cause the element to produce a refrigerating effect to thereby create a circulation of air within said food compartment, means for suspendingly supporting said cooling element from and in close proximity to the top wall of said liner member, and a metal baffle member interposed between said element and the top wall of said liner member to obstruct radiation of cold from the cooling element to the metal liner member for preventing condensation of moisture thereon, said baffle member being secured in position by said cooling element supporting means, and said baffle member being spaced from said cooling element and from said metal liner top wall of said compartment to thereby permit air circulating within the food storage compartment to flow across both sides thereof.

7. A refrigerating apparatus comprising in combination, a cabinet, a plurality of insulating walls forming a food storage compartment within said cabinet, a metal liner member for the walls of said food compartment, a cooling element of a refrigerating system supported in said compartment by being suspended from and disposed in close proximity to the top metal liner wall of said compartment, means for circulating a refrigerating medium through said element to cause the element to produce a refrigerating effect to thereby create a circulation of air within said food storage compartment, means interposed between said element and the top metal liner wall of said compartment adjacent the element to obstruct radiation of cold from said element to the top metal liner wall of the compartment for preventing condensation of moisture thereon, said last named means being spaced from said cooling element and from said top metal liner wall of the compartment to permit air circulating within said food storage compartment to flow on both sides thereof, and said last named means having upturned edge portions and being provided with an opening for the passage therethrough of any moisture condensed on and dripping from the top metal liner wall of said compartment.

EDMUND F. SCHWELLER.